Aug. 3, 1943.  D. B. REPLOGLE  2,325,633
INDICATOR FOR SUCTION CLEANING SYSTEMS
Filed Dec. 5, 1941  2 Sheets-Sheet 1
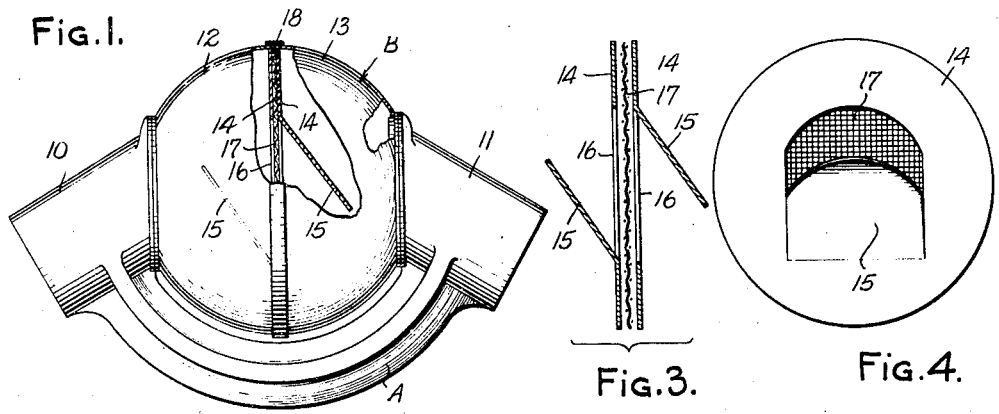
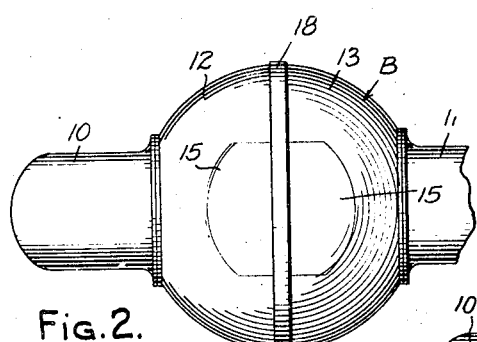
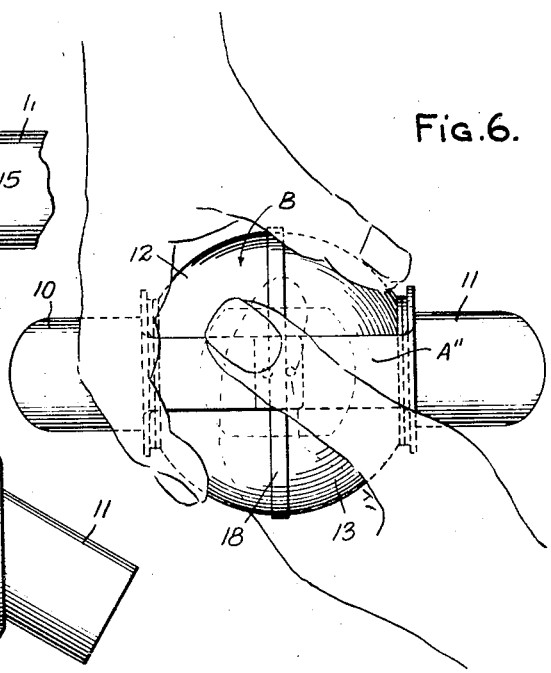
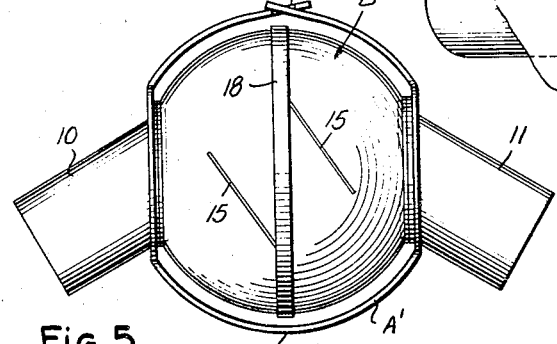
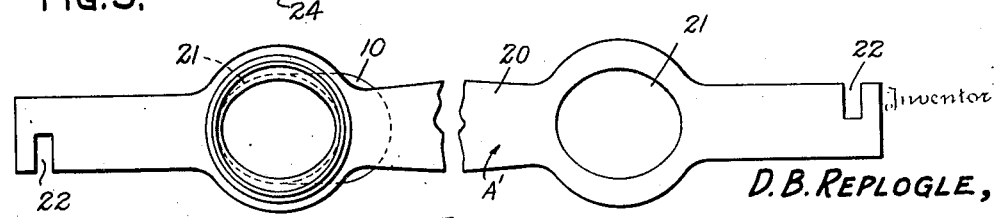

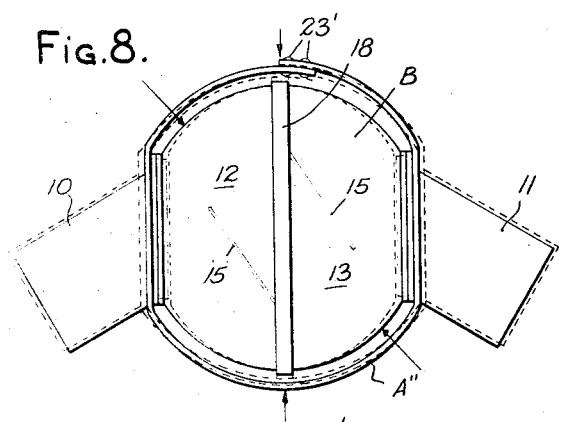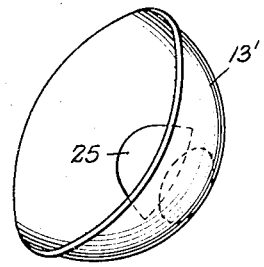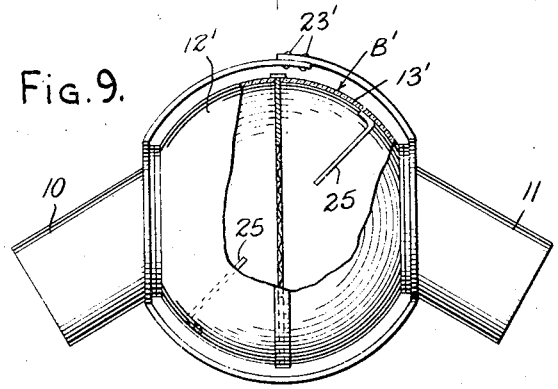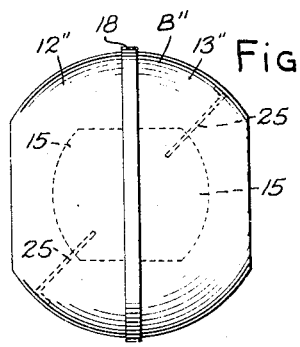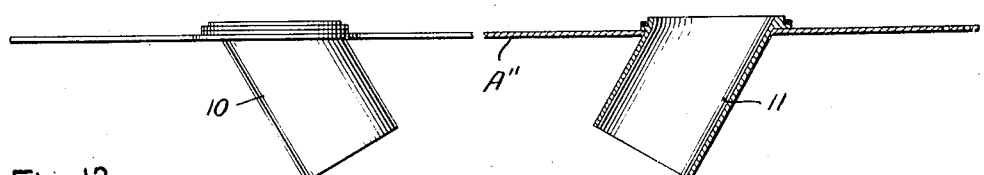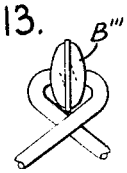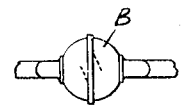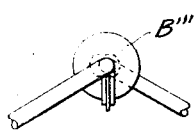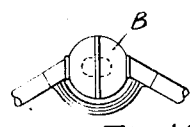

Patented Aug. 3, 1943

2,325,633

UNITED STATES PATENT OFFICE 2,325,633

INDICATOR FOR SUCTION CLEANING SYSTEMS

Daniel Benson Replogle, Berkeley, Calif., assignor to The Ohio Citizens Trust Company, Toledo, Ohio, a corporation of Ohio, as trustee Application December 5, 1941, Serial No. 421,853

5 Claims. (Cl. 302—65)

The invention relates to dust indicators for suction cleaning systems.

The primary object of the invention is to provide a dust indicator which will clearly demonstrate to the operator of a suction cleaner the quantity and quality of dust passing through the tubular elements of the system. The indicator is adapted to be suitably located between a pair of successive tubular elements of the cleaning system positioned intermediate the cleaning nozzle and the source of suction, as set forth in my aforesaid application and in the other applications referred to therein.

In common with the disclosure of my prior application Serial No. 415,800, the dust indicator of the present application includes a yoke or coupling element and a transparent globe-like display or indicator element, the latter having two circular polar openings, one for the admission of dust-laden air and the other designed for the discharge of air therefrom. The globe is mounted for rotation about a polar axis passing through the centers of the two openings and is supported by the yoke or coupling element, which is provided with inlet and outlet pipes whose axes are inclined with reference to the axis of rotation of the globular element.

One of the objects of the present invention is to provide improved means for deflecting the dust-laden air within the indicator, comprising, in the present case, deflecting tabs formed on the interior of the globular element, which serve not only to deflect the air stream, but to cause its reversal in direction as the globe is turned about its polar axis, thus serving to clear the indicator of accumulated dust.

Another feature of the invention is the provision of a simplified form of yoke or coupling element having a flexible portion permitting ready removal of the globe therefrom.

Other features and objects of the invention will be apparent from the following detailed description and the accompanying drawings, which are intended as illustrative but not as limiting the invention to the precise details set forth.

In the drawings:

Fig. 1 is a side elevation of one embodiment of the invention wherein a solid form of yoke is employed, in conjunction with tabs struck out from central diaphragms forming parts of the globe;

Fig. 2 is a top plan view of the same;

Fig. 3 is a detailed exploded view of the diaphragms and screen portion of the globular element, showing the struck-out tab;

Fig. 4 is an end elevation showing one of the diaphragm portions with its struck-out tab, revealing the central screen portion;

Fig. 5 is a view similar to Fig. 1, but showing a modification wherein flexible form of yoke is employed;

Fig. 6 is a top plan view of the modified form illustrating the manner of removing the globe from the yoke;

Fig. 7 is a developed plan view showing a flexible portion of the yoke with one of the coupling pipes applied thereto;

Fig. 8 is a view similar to Fig. 5, but showing a further modification, and illustrating in dotted lines the operation of compressing the yoke to permit removal of the globe;

Fig. 9 is a similar view, partly in section to show the interior, of the globular element setting forth a still further modification wherein the deflecting tabs are formed in the semi-spherical shell portions of the globular element;

Fig. 10 is a perspective view showing one of the semi-spherical portions of Fig. 9;

Fig. 11 is a plan view showing a still further modified globular element having struck-out tabs at the center and inwardly projecting tabs secured to the outer spherical portions;

Fig. 12 is a developed view, partly in section and partly in elevation, showing the flexible yoke element with the coupler or pipe elements attached thereto;

Fig. 13 is a diagrammatic view, on a small scale, showing a modification wherein an oblate spheroid is used, and illustrating tabs applicable to that form, and further showing an arrangement of the pipes wherein the incoming dust is on the side next to the operator of the device.

Figs. 14 and 15 show the tab feature where the spheroid has the diaphragm arranged so that when the device is held in the right hand, the left-hand side is the incoming dust side of the device.

Figs. 16 and 17 suggest the application of the tabbed diaphragm where the form of yoke shown in application Serial No. 415,800 is employed.

Referring to the drawings in detail, A denotes the yoke or coupling element which includes inlet and outlet pipes 10 and 11 communicating with a transparent globular indicator element B. These parts are adapted to be used in connection with a suction cleaning system as set forth in detail in my prior application Serial No. 415,800 and in the other applications referred to therein.

The globe B comprises two semi-spherical members 12 and 13, each having a polar opening adapted to be placed in communication with one or the other of the pipes 10 or 11 of the coupling element. The globe is preferably formed of light, somewhat flexible material, such as celluloid, to permit assembly with the yoke, as set forth in my prior application Serial No. 415,800.

According to the present application, each semi-spherical member 12, 13 includes a diaphragm portion 14, preferably forming part of the semi-spherical member. Each diaphragm has a struck-out tab portion 15 leaving an opening 16. A screen 17 is preferably included between the two diaphragm portions 14, 14. When the semi-spherical members are assembled as shown in Figs. 1 and 2, an air-tight fit is insured by the use of a rubber band or like sealing ring 18, surrounding the equator of the globe.

In the embodiment of the invention shown in Figs. 5, 6 and 7, a modified form of yoke A' is disclosed, which yoke includes a flexible strap 20 having two elliptical openings 21, 21 adapted to receive the two coupling pipes 10 and 11, as further illustrated in the modification of the invention shown in Fig. 12.

The ends of the strap 20 are notched at 22 to permit their attachment to each other as illustrated at 23 in Fig. 5. By compressing the yoke at opposite portions 23 and 24 as illustrated in Fig. 6 and as represented by arrows in Fig. 8, the inlet and outlet pipes 10 and 11 will be moved slightly apart, as also illustrated in Fig. 8, to permit removal of the globe without the necessity for compressing the globe. This arrangement is important as it permits making the globe of heavier material, and also permits the use of tabs on the concaved walls of the globe, as illustrated in Figs. 9, 10 and 11.

The form of yoke A" shown in Figs. 8, 9 and 12 is the same as that shown in Figs. 5, 6 and 7, except that the ends of the yoke A" are shown as riveted together at 23' instead of being releasably secured together as in the form A'.

In the form of globe B' shown in Figs. 9 and 10, the semi-spherical globular members are shown as provided with tabs 25 projecting inwardly from the concave interior portions of the semi-spheres.

In Fig. 11 both forms of tabs 15 and 25 are shown as employed together. The function of the tabs 15 and 25 is to deflect the dust-laden air upon the interior surface of the globe B", thus producing a whirling motion and revealing the quantity and quality of dust carried by the air.

It will be noted that while an angularly placed diaphragm, such as is disclosed in my prior application Serial No. 415,800, will cause whirling in divers directions as it is progressively turned in the angularly directed air stream, the present construction permits of placing the diaphragm directly at right angles to the path of the stream, while tabs integrally made by cutting from the center of the screen-holding rings or diaphragms 14, 14, of which there are two, serve to deflect the air for whirling purposes and also serve to reverse the whirling operation. The openings 16, from which the tabs are cut, each contribute one-half of the circular opening for passageway through the screen.

Where tabs are provided both on the diaphragm, as at 15, and on the interior walls, as at 25, they may be located at quartering positions circumferentially, so that when the globe B" is turned on its axis the whirl of the stream is reversed twice as often as when tabs 15 alone are depended upon. This combination of tabs 15 and 25 is illustrated in Fig. 11. The present invention contemplates the use of tabs on a flat diaphragm alone, or on the interior curved surface alone, or the conjoint use of both types of tabs.

While in the foregoing description the globular element is composed of substantially semi-spherical halves, it will be apparent that dish-shaped halves may be employed to make up the globular element B'", as illustrated, for example, in Figs. 13, 14 and 15. It is intended that the oblate spheroids disclosed in these figures shall be included in the term "globular element" as used in the accompanying claims.

The invention has been described in detail for the purpose of illustration, but it will be obvious that numerous modifications and variations may be resorted to without departing from the spirit of the invention.

What I claim is:

1. A suction cleaning system including a plurality of tubular suction elements, a dust indicator interposed between a pair of successive tubular elements, comprising a rotatably mounted transparent globular element, composed of a pair of concave members united together, each having a diaphragm portion at the meeting portions of the concave members, openings in said diaphragms, a screen between said diaphragms, and deflecting tabs carried by said globular elements for deflecting entering dust laden air to the periphery of said globular element.

2. A suction cleaning system as set forth in claim 1 wherein the deflecting tabs are struck out from the diaphragms to form the central openings.

3. A suction cleaning system as set forth in claim 1 wherein the deflecting tabs project inwardly from the concave interior surface of the globular element.

4. A suction cleaning system as set forth in claim 1 wherein the tabs are formed both on the diaphragm portions and the concave interior of said globular element.

5. A suction cleaning system as set forth in claim 1 wherein the globular element is rotatably mounted between inclined inlet and outlet pipes carried by a flexible yoke, permitting separation of the pipes to facilitate removal or replacement of the globular element, or reversal of the same end for end.

DANIEL BENSON REPLOGLE.